(12) United States Patent
Savioz et al.

(10) Patent No.: US 10,448,781 B2
(45) Date of Patent: Oct. 22, 2019

(54) PUMPING AND FOAMING DEVICE

(71) Applicant: NESTEC S.A., Vevey (CH)

(72) Inventors: Gregory Savioz, Miege (CH); Youcef Ait Bouziad, Echandens (CH); Alexa Perrin, Savigny (CH)

(73) Assignee: Societe des Produits Nestle S.A., Vevey (CH)

( * ) Notice: Subject to any disclaimer, the term of this patent is extended or adjusted under 35 U.S.C. 154(b) by 123 days.

(21) Appl. No.: 15/320,136

(22) PCT Filed: Jun. 22, 2015

(86) PCT No.: PCT/EP2015/063906
§ 371 (c)(1),
(2) Date: Dec. 19, 2016

(87) PCT Pub. No.: WO2015/197509
PCT Pub. Date: Dec. 30, 2015

(65) Prior Publication Data
US 2017/0127875 A1 May 11, 2017

(30) Foreign Application Priority Data
Jun. 25, 2014 (EP) .................................. 14173791

(51) Int. Cl.
*A47J 31/40* (2006.01)
*A47J 31/46* (2006.01)
*A47J 31/44* (2006.01)

(52) U.S. Cl.
CPC ........... *A47J 31/4485* (2013.01); *A47J 31/46* (2013.01)

(58) Field of Classification Search
CPC .... A47J 31/44; A47J 31/4485; A47J 31/4489; A47J 31/4496; A47J 31/46; A47J 31/468
USPC ....................... 99/279, 280, 289 R, 452, 453; 222/383.1, 383.3, 385
See application file for complete search history.

(56) References Cited

U.S. PATENT DOCUMENTS

| 3,712,512 A | * | 1/1973 | Snider, Jr. | ............... A45D 27/10 |
| | | | | 175/359 |
| 5,238,155 A | * | 8/1993 | Blake, III | ............... A45D 27/10 |
| | | | | 222/190 |
| 8,215,521 B2 | * | 7/2012 | Quinlan | .................... A47K 5/16 |
| | | | | 222/1 |

(Continued)

FOREIGN PATENT DOCUMENTS

| CN | 1853545 A | 11/2006 |
| CN | 101511237 A | 8/2009 |

(Continued)

*Primary Examiner* — Sang Y Paik
(74) *Attorney, Agent, or Firm* — K&L Gates LLP

(57) ABSTRACT

Pumping and foaming device (100) comprising a container compartment (20) where a foamable fluid (1) is stored, an air entry (13) through which air is provided into the device (100) and a processing compartment (10) where fluid is pumped and foamed with air, the processing compartment (10) comprising at least one movable part and a static part, movable with respect to each other; said parts being arranged in such a way that their relative movement pumps fluid by suction from the container compartment (20) respectively into the processing compartment (10), and also drives the mixture of air and fluid through a thin gap providing a certain level of shear stress which allows this mixture to foam.

18 Claims, 4 Drawing Sheets

(56) References Cited

U.S. PATENT DOCUMENTS

| | | | | |
|---|---|---|---|---|
| 2008/0203591 A1* | 8/2008 | Pelfrey | ............... | A47K 5/16 |
| | | | | 261/28 |
| 2011/0143006 A1* | 6/2011 | Douma | ............... | A47J 31/4485 |
| | | | | 426/474 |
| 2012/0285992 A1* | 11/2012 | Ciavarella | ............... | F04C 13/00 |
| | | | | 222/138 |

FOREIGN PATENT DOCUMENTS

| | | |
|---|---|---|
| CN | 102316776 A | 1/2012 |
| DE | 202007009537 | 10/2007 |
| WO | 2014087280 | 6/2014 |

* cited by examiner

PUMPING AND FOAMING DEVICE

CROSS REFERENCE TO RELATED APPLICATIONS

The present application is a National Stage of International Application No. PCT/EP2015/063906, filed on Jun. 22, 2015, which claims priority to European Patent Application No. 14173791.6, filed Jun. 25, 2014, the entire contents of which are being incorporated herein by reference.

FIELD OF THE INVENTION

The present invention is directed to a device for pumping and foaming a fluid, preferably for producing milk foam. In particular, the invention is directed to a pumping and foaming device producing very high quality fluid foam on demand in a quick, simple, repeatable and clean manner.

BACKGROUND OF THE INVENTION

Foams consist of two phases, an aqueous phase and a gaseous (air) phase. A fluid foam is therefore a substance which is formed by trapping many gas bubbles in a fluid structure: producing a fluid foam involves not only the generation of these gas bubbles, but also the packing and the retention of these bubbles into the overall fluid structure in order to provide a stable foam.

It is desirable to produce food foams obtained from food fluid products with the tiny and stable air bubbles to provide a light texture and different mouth feel. In most of the food foams, proteins are the main surface active agents helping in the formation and stabilization of the dispersed gaseous phase, creating protein-stabilized foams. Proteins will always have certain stresses to overcome, such as mechanical and gravitational: the capacity of proteins to stabilize the foaming structure formed against these stresses will determine foam stability, usually expressed as the time required for 50% of the fluid to drain from the foam, i.e., the time required for reaching a 50% reduction in the foam volume.

When foaming a fluid, it would be desirable to produce foam on demand, having a superior quality. Moreover, it would be desirable to provide this prime quality foam as quickly as possible and in a repeatable way, meaning that the foam quality is controlled and can be repeated from one fluid to another.

One of the most commonly used food fluid foams is milk foam. Devices for producing milk foam are well known in the state of the art: typically, these devices comprise a reservoir, into which milk is filled, the reservoir being also provided with a rotating part, typically a whisk arranged in its lower surface, causing the foaming of the milk by agitating the milk which in turn traps air inside the liquid film. The production of milk foam in these known devices requires however time, quite a number of manipulations and also requires cleaning every time foam is produced. Also, in order to regulate the characteristics of the foam obtained, the geometry of the whisk needs to be controlled, something which is hard to understand and control in a precise way, making any repeatability of the process too complex and not achievable.

Document EP 2478804 A1 in the state of the art, for example, discloses a milk reservoir pressurized by gas, the pressurized milk being directed to a mixing area for being further mixed with another gas. Later frothing and reduction of the size of bubbles occurs in a frothing arrangement, comprising typically a static mixer or a rotating whisk. However, the regulation and control of the foaming in such systems is complicated and not precise, also requiring a complex configuration. Moreover, these systems require cleaning after foaming has been produced, which is both cumbersome and time consuming.

Other documents known in the state of the art, such as US 2013/0043274 A1, describe packaging solutions providing storing, dosing and dispensing functions particularly adapted for food fluid products, typically beverages, comprising a container, dosing means and a valve. The dosing means comprise a rotor with at least a truncated part driven in rotation and working as a dosing device, taking liquid from a dosing inlet and driving it to a dosing outlet, such that the liquid from the container is conveyed into a mixing chamber where it is mixed with a diluent: when this diluent is gas ($N_2$ or $CO_2$) a head of foam is provided on the upper layer of the beverage. However, the foaming process in this system is not produced in a controlled and precise way, being very difficult to monitor and to regulate it and, consequently, to obtain repeatable results from one fluid foamed to another.

Accordingly, other solutions have been provided to allow the production of foaming fluids in a controlled and regulated manner. An example is provided in EP 12199185.5 belonging to the same applicant, where a device for producing milk foam is disclosed: high shear stress is applied to a milk-air mixture in the gap between two cylinders rotating with respect to each other, the shear stress leading to an emulsion of the milk and the air, with a later foaming effect once expansion occurs. With this solution, milk foam can be produced in a controlled way. However, the device is relatively complex and requires frequent cleaning after milk foam has been produced, something which is time consuming and not attractive for the user.

There are also well known foaming devices in the state of the art which use steam to foam via a Venturi effect, such as for example the devices shown in EP 2695556 A1 or in EP 2636343 A1. Document EP 2695556 A1 discloses a device for preparing heated milk foam having a suction device comprising a mixing chamber with vapour and milk, such that this mixture is suctioned through utilizing Venturi effect, so that milk foam is provided. Another example is provided in document EP 2636343 A1, where a device for producing heated milk foam is described: this device uses a narrowing nozzle, particularly a Venturi nozzle, for obtaining a suction effect of milk and vapour, in order to produce milk foam. However, these known systems using the Venturi effect are not operated in a clean way, the milk being repeatedly in contact with the device which not only imposes often cleaning but which can also be a source of product contamination. Moreover, these devices only allow the production of hot milk foam: cold milk foam is not an option when using such systems. Apart from this, the quality of the foam obtained by using these systems is not satisfying.

Therefore, there is still a need to provide a simple device which is able to produce high quality foam on demand, in a short time, in a reliable and repeatable way and which is clean. The present invention aims at providing a foaming device which addresses these needs.

SUMMARY OF THE INVENTION

According to a first aspect, the invention is directed to a pumping and foaming device 100 comprising a container compartment 20 where a foamable fluid 1 is stored, an air entry 13 through which air is provided into the device 100 and a processing compartment 10 where air and fluid are pumped and foamed. The processing compartment 10 comprises at least a movable part and a static part, movable with respect to each other, and arranged in such a way that their relative movement pumps air and fluid by suction from the air entry 13 and from the container compartment 20 respectively into the processing compartment 10, and also drives the pumped mixture of air and fluid under certain level of shear stress which allows this mixture to foam.

According to a first embodiment, the movable part comprises a pumping gear 11 and a disc 121, and the static part comprises an outside chamber 122: the disc 121 is rotatable with respect to the outside chamber 122, the pumping gear 11 comprises a rotatable driver gear 111 and a rotatable driven gear 112 whose relative rotation creates a suction area 113, where air and fluid are pumped by suction and are pre-mixed, and a pushing area 114, where the pre-mixture of pumped air and fluid is driven in between the disc 121 and the outside chamber 122 under certain level of shear stress which allows it to be foamed.

According to a second embodiment, the movable part comprises a disc 121 and the static part comprises an outside chamber 122: the disc 121 is rotatable with respect to the outside chamber 122, and the container compartment 20 is configured as a capsule, such that the relative rotation of the disc 121 with respect to the outside chamber 122 pumps air and fluid by suction using centrifugal forces and also foams the pumped air and fluid by shear stress.

According to a third embodiment, the movable part comprises pumping and foaming gear 110 and the static part comprises an outside chamber 122, the disc 121 being rotatable with respect to the outside chamber 122 comprising an upper disc part 122' and a lower disc part 122" such that the pumping and foaming gear 110 is arranged between the upper disc part 122' and the lower disc part 122". The pumping and foaming gear 110 comprises a rotatable driver gear 111 and a rotatable driven gear 112 whose relative rotation creates a suction area 113, where air and fluid are pumped by suction and are pre-mixed, and a pushing area 114, where the foamed mixture of air and fluid is driven outside the device 100.

According to a second aspect, the invention is directed to a pumping and foaming system comprising a pumping and foaming device 100 as described above and a machine 30, such that the foaming device 100 is connectable to the machine 30 and the machine 30 comprises driving means 31 moving the movable part.

As it will be further described in detail, the device 100 of the invention is able to provide superior quality foam on demand with adjustable foam texture and thickness, with very high stability, the foam delivery having quick and stable foam settling. Furthermore, the device of the invention is compact, needs very limited equipment on the machine side is easy to use on the part of the user and clean. Even more, the device provides repeatability of the foam obtained, such that the same foam can be essentially obtained from one beverage to the other, thanks to the fact that the process carried out in the device is controlled by acting on limited and stable parameters, thus providing high reliability of results.

In the present description, the term "fluid" means a liquid or a mixture of liquid and gas.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

The pumping and foaming device 100 according to the present invention comprises a processing compartment 10 and a container compartment 20. The container compartment 20 comprises a fluid 1 which aims at being foamed, and the processing compartment 10 is designed for pumping the fluid 1 from the container compartment 20 and for foaming it. Typically, the fluid 1 processed in the foaming device 100 of the invention is preferably a food or beverage liquid such as milk, though any kind of foamable fluid can be used, such as cream, yoghurt, ice-cream liquid mix, non-dairy products or mixes, etc.

In a preferred embodiment of the invention, the processing compartment 10 is configured as a lid or cap and the container compartment 20 can be configured as a multi-dose container such as bottle or pouch or as a single-dose container such as a capsule or small sachet or pad. However, it is clear that any other possible embodiment of the invention would also be comprised within the scope of the present patent application and within the scope of the attached claims.

Preferably, the pumping and foaming device 100 of the invention is fully disposable, so no cleaning operations are needed. Optionally, the pumping and foaming device 100 can be cleanable and therefore can be reusable.

Typically, the pumping and foaming device 100 allows a plurality of pumping and foaming operations until the container compartment 20 has been emptied of fluid 1. Between the different foaming applications carried out, the pumping and foaming device 100 is conserved in a proper conservation area, typically in a refrigerator, in order to keep the fluid 1 in a proper condition.

As it will be described in detail in the following description of the preferred embodiments, the device of the invention is able to provide superior quality foam on demand: micro foam will be delivered, with a higher quality to the foam currently on the market, with adjustable foam texture and thickness, such that the foam delivery will have a quick and stable foam settling. Furthermore, the device of the invention is compact, needing very limited equipment on the machine side, easy to use on the part of the user and clean, as no fluid comes in contact with the machine. Also, as it will be explained in detail, the foam provided by the device can be either hot or cold, and will have very high stability. Even more, the device provides repeatability of the foam obtained, such that the same foam can be essentially obtained from one beverage to the other, thanks to the fact that the process carried out in the device is controlled by acting on limited and stable parameters, thus providing high reliability of results.

Figure 1:
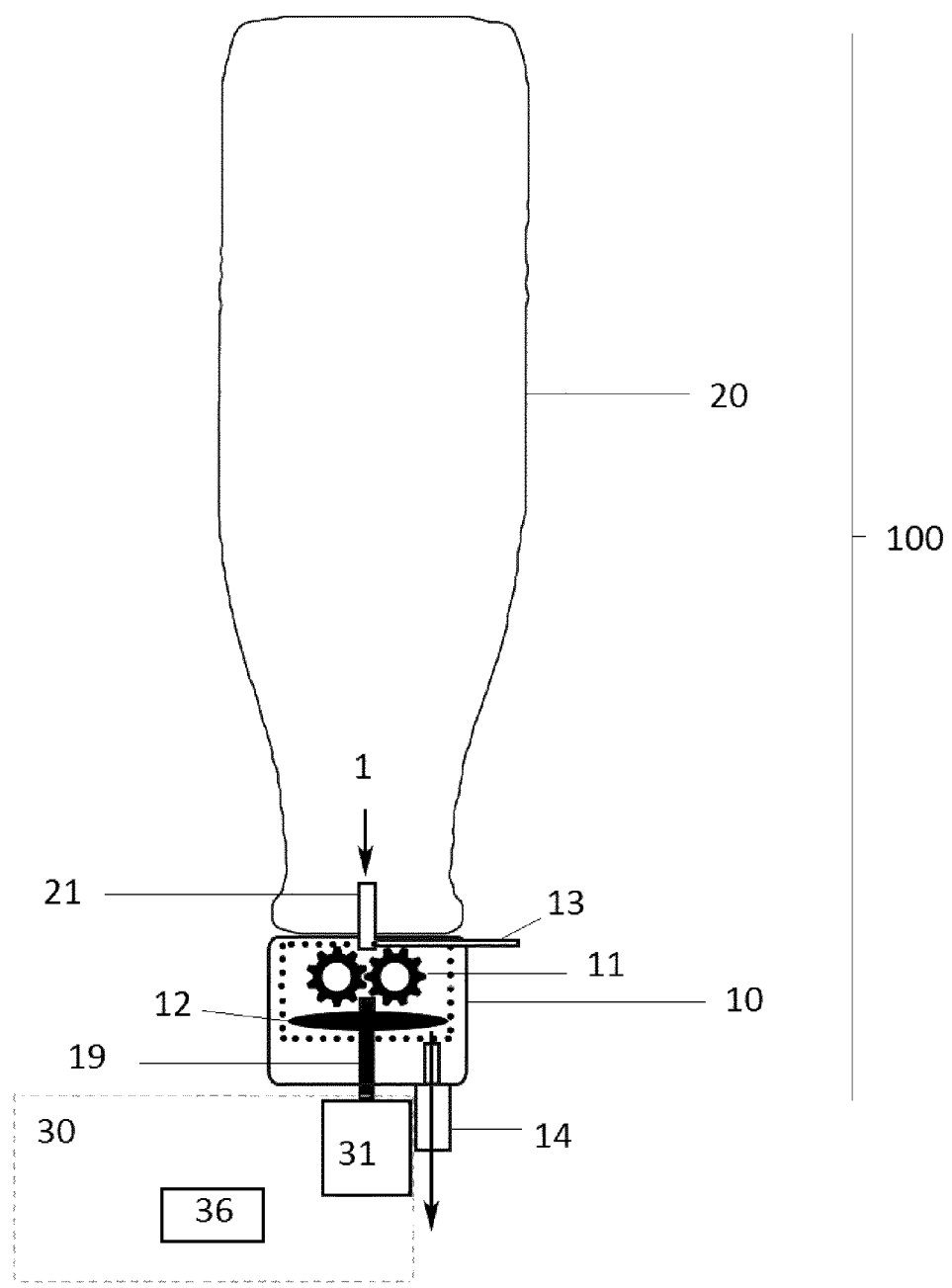
FIG. 1 shows a schematic view of the main components of the pumping and foaming device of the invention, according to a first preferred embodiment.
Figure 2A:
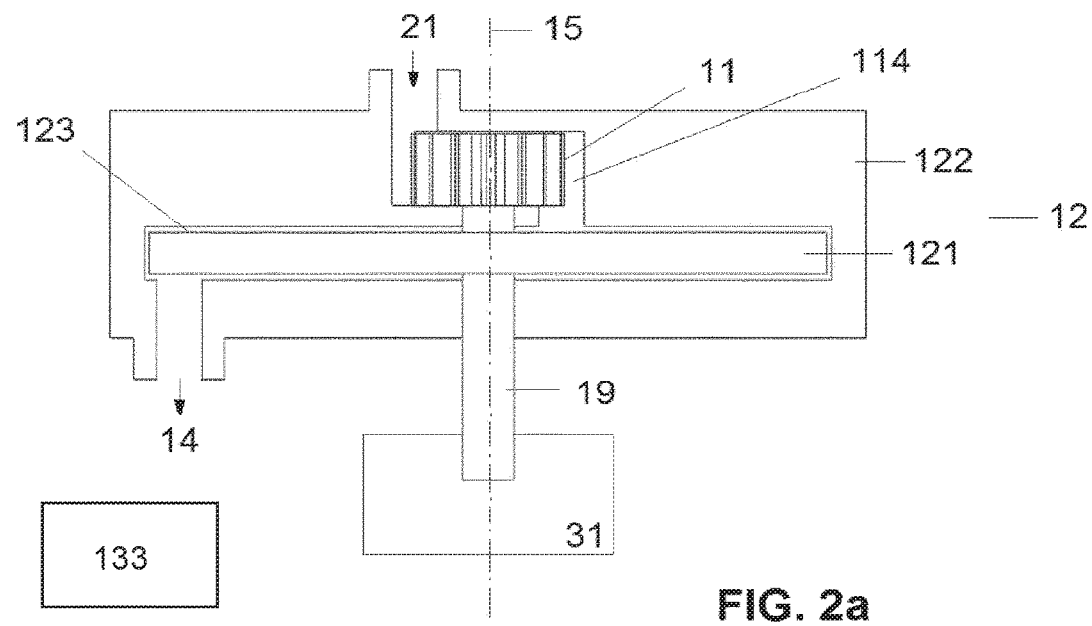
FIGS. 2a-b show the arrangement of the processing compartment in the pumping and foaming device of the invention, according to a first preferred embodiment shown in FIG. 1.
Figure 2B:
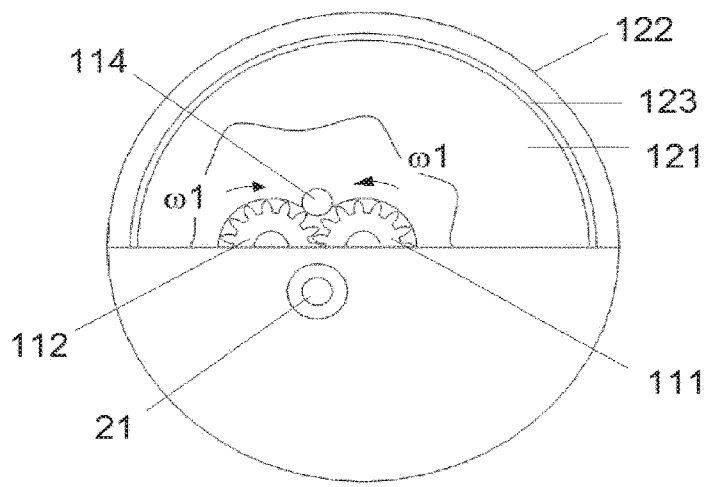

According to a first embodiment of the invention, as shown in FIGS. 1 and 2, the pumping and foaming device 100 comprises a processing compartment 10, preferably shaped as a cap or lid, and a container compartment 20, preferably shaped as a bottle, comprising a fluid 1 to be foamed. The processing compartment 10 comprises a pumping gear 11 and a foaming element 12. The foaming element 12 comprises a movable part 121 rotating within an external surrounding static part 122, such that a gap 123 is formed between these two parts. Preferably, the movable part 121 is configured as a disc, and the static part 122 is configured as an outside chamber surrounding the inner rotating disc, both parts being concentrically arranged with respect to a common rotation axis 15, as shown in FIGS. 2a and 2b.

The pumping gear 11 preferably comprises two gears, a driver gear 111 and a driven gear 112. The processing compartment 10 also comprises an air entry 13 arranged in such a way that the rotation of the pumping gear 11, arranged below the container compartment 20, creates a suction effect of both the fluid 1 comprised within the container compartment 20 together with air coming from the air entry 13. The air and the fluid are pre-mixed by being entrained and driven together through the pumping gear 11, before entering the foaming element 12. More in detail, as shown in FIG. 2b, where a sectional inside cut is shown for clarity, when the driver gear 111 is rotated, it drives in rotation in opposite sense the driven gear 112, such that two areas are created in the pumping gear 11: a suction area 113 where fluid 1 and air from the air entry 13 are sucked, and a pushing area 114 where the sucked fluid 1 and air are pre-mixed and are driven towards the foaming element 12. In this process, the air and fluid are actually pre-mixed before entering the foaming element 12.

The driver gear 111 and the driven gear 112 in the pumping gear 11 can be of the same diameter or of different diameters, then having different rotational speeds.

Once in the foaming element 12, particularly once in the gap 123, the mixture of fluid and air is passed by Couette flow: Couette flow refers to a laminar flow of a viscous fluid in the space between two parallel plates, such that one plate is moving relative to the other; the flow is driven by shear force acting on the fluid comprised between the two plates, such that foaming energy is provided through high shear energy to this fluid, which is emulsified. According to the invention, the pre-mixture of fluid and air is driven by shear stress in the gap 123, as the disc 121 rotates with respect to the static outer chamber 122. The shear stress provided to the mixture of fluid and air in the gap 123 allows decreasing the size of the air bubbles comprised within the structure of the fluid, so that these bubbles can be more efficiently trapped within the fluid matrix, which highly increases the stability of the foam obtained. Foam is provided through the foam outlet 14.

The amount of air sucked by the pumping gear 11 can be adjusted by the size of the air entry 13 and by the rotational speed of the pumping gear 11. Preferably, the adjustment of the size of the air entry 13 is done through an air regulator, typically of the type comprising an adjustable screw, motorized or not, which allows regulating the section of the air entry 13 from a bigger section of the air entry 13 or a smaller one. Preferably, an elastomeric sealing joint is provided in the connection between the processing compartment 10 and the machine 30, in order to prevent any leakage in this connection. The adjustment of the section of the air entry 13 allows the regulation of the thickness of the foam which will be provided through the foam outlet 14.

With respect to known devices in the prior art, the start-up time is reduced with the configuration of the invention because the air is directly sucked and mixed with the fluid, so there is no need to wait for any pressure stabilization of the air and the fluid, as would be the case in foaming devices in the prior art. Also, repeatability is increased from one foaming operation to another, as the device does not operate with many variables or parameters. Even more, the pre-mixing operated by the pumping gear 11 fastens the foaming in the foaming element 12, allowing lower dimensions in the size of the elements configuring the foaming element 12: as illustrated in FIGS. 2a and 2b, a known configuration of a foaming element carrying out a Couette flow effect, comprising two cylinders rotatable with respect to each other, is now replaced in the invention with a disc 121 having a low height (that is, being substantially flat), surrounded by an outer chamber 122 with also a low height.

The processing compartment 10 is connectable to driving means 31 (preferably a motor) through connecting means 19, typically comprising a shaft: the driving means 31 rotate the inner disc 121 with respect to the outer chamber 122, at a given rotational speed $\omega_1$. Because the disc 121 and the pumping gear 11 are mechanically connected, the driving means 31 also entrain in rotation at the same time the pumping gear 11 which rotates at the same rotational speed $\omega_1$ which thus rotates the driven gear 112 with a rotational speed $-\omega_1$ (see FIGS. 2a and 2b). Therefore, according to the invention, with the same rotation $\omega_1$ provided by the driving means 31, two effects are obtained: the pumping or sucking effect by the rotation of the pumping gear 11, and the foaming effect, with the rotation of the inner disc 121 with respect to the outer chamber 122. Thus, the invention makes the pumping and foaming in a more efficient way, compared to any other solutions known in the prior art.

The pumping and foaming device 100 of the invention is connectable to a machine 30, this machine 30 comprising the driving means 31, which drive in rotation the inner disc 121 of the foaming element 12 and the pumping gear 11.

Optionally, the machine 30 can comprise an air pump connectable to the processing compartment 10 and providing air through the air entry 13, typically as a function of the voltage applied to this air pump. A regulator can also be provided in the connection of the air pump with the processing compartment 10.

Also optionally, the machine 30 can comprise a heating element 133 to heat the foam once formed, after exiting the foam outlet 14, in such a way that there is no contact between the foam and the machine 30.

Optionally, the machine 30 can also comprise control means 36 which will manage and control the foaming process parameters in the pumping and foaming device 100, as it will be further explained in detail. As an alternative, it is also possible that the machine 30 comprises no control means 36, meaning that the user will then adjust manually part or all of the parameters of the foaming process in the pumping and foaming device 100.

The type of foam obtained from a fluid primary depends on the type of fluid which is foamed. When foaming milk, for example, the type of foam obtained varies depending on the type of milk used, such as raw whole milk, pasteurized homogenized full-cream milk, pasteurized skim milk, UHT homogenized full-cream milk, UHT skim milk, etc. For a given type of milk, leaving apart the processing conditions used during its manufacture, foaming properties are largely determined by the temperature at which milk is foamed and by its fat content. In general, low fat milk foams better at low temperatures: this also applies to both whole milk and cream, although to a lower extent.

On the other hand, the quality of fluid foam is determined by foam properties, such as: quantity and size of the air bubbles formed in the fluid structure once foamed; foam stability, defined as the amount of foam which is stable, i.e., which substantially keeps its volume, usually expressed as the time required for 50% of the fluid to drain from the foam (the time required for reaching a 50% reduction in the foam volume), and foaming level defined as the ratio of the volume of fluid entering the processing compartment 10 with respect to the volume of foam provided by the foam outlet 14 (also known as foam overrun, which is defined as the increase in volume in a certain initial volume of fluid by the effect of foaming).

Therefore, for a given type of fluid 1 (i.e., the fat content and the processing conditions during the fluid manufacture are fixed values), the properties of the foam obtained (quantity/size of bubbles, stability and overrun) for this fluid 1 will be determined by the foaming process carried out in the pumping and foaming device 100 of the invention, specifically by the process parameters detailed as follows.

Fluid flow rate passing from the container compartment 20 into the processing compartment 10 which depends on the rotational speed $\omega_1$ of the pumping gear 11, on the diameter of the fluid inlet 21 providing fluid 1 from the container compartment 20 and on the size of the teeth of the pumping gear 11.

Amount of air coming from the air entry 13, depending on the rotational speed $\omega_1$ of the pumping gear 11 and on the size of the air entry 13, adjustable through a regulator.

In the Couette flow effect carried out in the pumping and foaming device 100 of the invention, the shear stress experienced by the mixture of fluid and air in the foaming element 12 depends largely on the width of the gap 123 formed between the external wall of the inner disc 121 and the internal wall of the outer chamber 122. According to the invention, the pumping and foaming device 100 has a given width of the gap 123, which is chosen depending on the type of fluid 1 in the container compartment 20 which is to be foamed, chosen in such a way that optimal foaming effect by shear (Couette flow) is obtained. Typically, the width of the gap 123 is larger as more viscous the fluid 1 to be foamed is: for example, milk would require a much smaller gap 123 than liquid yogurt. Typically, the width of the gap 123 for milk is around 0.3 mm and the width for liquid yogurt is around 0.4 mm.

According to the invention, preferred values of the rotational speed $\omega_1$ of the disc 121 and of the pumping gear 11 are comprised between 2000 and 10000 rpm, preferably between 4000 and 8000 rpm.

Preferably, according to the invention, the pumping and foaming device 100 also comprises a code, typically a bar code, which can be arranged either on the container compartment 20 or on the processing compartment 10. The code comprises the information of at least one of the following process parameters, detailed below, which is provided to the control means 36 in the machine 30 to carry out the foaming process in an optimal way.

Rotational speed $\omega_1$ of the disc 121 and therefore of the pumping gear 11.

Size of the air entry 13 or optionally amount of air pumped by the air pump.

It is also possible according to the invention to add an additive compartment (not shown) adjacent to the pumping and foaming device 100, preferably in a releasable way, which provides an additive comprised in it simultaneously with the foam at the foam outlet 14. Preferably, the control means 36 in the machine 30 control with the information comprised in the code the ratio of the additive delivery with respect to the foam delivered at the foam outlet 14.

Figure 3:
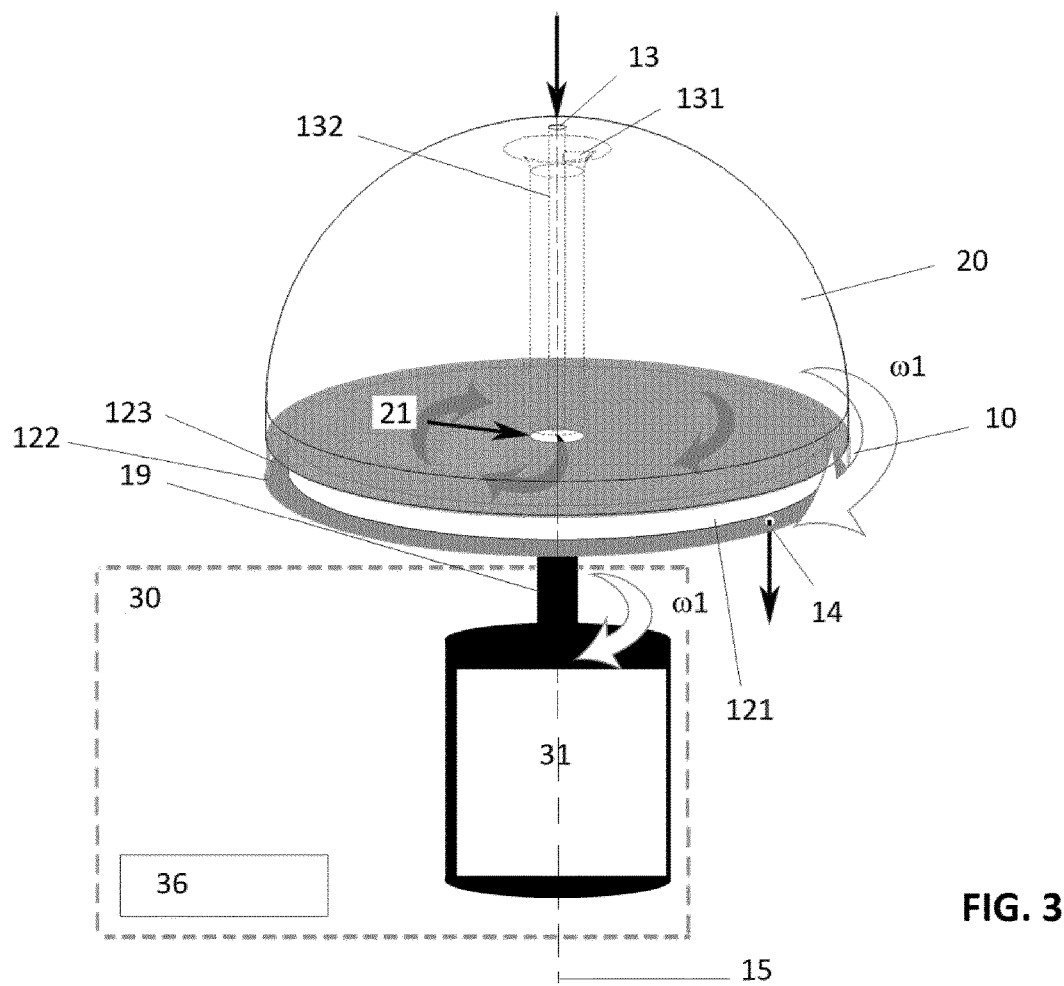
FIG. 3 shows a schematic view of the main components of the pumping and foaming device of the invention, according to a second preferred embodiment.

According to a second embodiment of the invention, as shown in FIG. 3, the pumping and foaming device 100 comprises a processing compartment 10 and a container compartment 20: the container compartment 20 is attached to the processing compartment 10, preferably configuring a capsule, as shown in FIG. 3. The foaming element preferably comprises an inner disc 121 concentrically arranged with respect to an outer chamber 122 having a common rotation axis 15, such that a gap 123 is formed between the inner wall of the outer chamber 122 and the external wall of the inner disc 121. The fluid 1 is kept inside the container compartment 20, i.e., in the upper volume part of the capsule. The container compartment 20 comprises a single air entry 13 preferably arranged in the upper side of the capsule: the air entry 13 is linked to two channels, a primary air channel 131, allowing air to enter in the container compartment 20 in order to replace the fluid 1 that has been driven to the foaming element 12, and a secondary air channel 132, driving air into the foaming element 12, particularly into the gap 123, where the mixture of fluid 1 and air takes place.

According to this second embodiment, the driving means 31 entrain in rotation the foaming element 12, particularly drive in rotation the inner disc 121 with a rotational speed $\omega_1$ with respect to the outer chamber 122, which remains static. The rotation of the disc 121 sucks the fluid 1 which is kept inside the container compartment 20 thanks to the centrifugal forces created and, at the same time, sucks air through the air entry 13. The air sucked though the air entry 13 is directed partly towards the primary air channel 131, replacing the fluid which has been pumped into the foaming element 12, and is partly directed towards the secondary air channel 132, driven into the gap 123. Within the gap 123, the fluid 1 and the air from the secondary air channel 132 are mixed, further being driven by shear stress calculated in such a way that allows that this mixture is emulsified by the rotation of the disc 121 under $\omega_1$ under the Couette flow effect, as already described for the first embodiment. Foam is provided through the foam outlet 14.

With the configuration in this second embodiment, the pumping capabilities of the pumping and foaming device 100 are somewhat lower than those of the first embodiment, but the configuration of the device is much simpler in return.

The processing compartment 10 is connectable to driving means 31 (preferably a motor) through connecting means 19, typically comprising a shaft: the driving means 31 rotate the inner disc 121 with respect to the outer chamber 122, at a given rotational speed $\omega_1$. Therefore, with one rotation $\omega_1$ provided by the driving means 31, two effects are obtained: the pumping or sucking effect and the foaming effect, both obtained through the rotation of the inner disc 121 with respect to the outer chamber 122, therefore making the pumping and foaming in a very efficient way.

The pumping and foaming device 100 of the invention is connectable to a machine 30, this machine 30 comprising the driving means 31, which drive in rotation the inner disc 121 of the foaming element 12.

Optionally, the machine 30 can comprise an air pump connectable to the processing compartment 10 and providing air through the air entry 13, typically as a function of the voltage applied to this air pump. A regulator can also be provided in the connection of the air pump with the processing compartment 10.

Also optionally, the machine 30 can also comprise a heating element 133 to heat the foam once formed, after exiting the foam outlet 14, in such a way that there is no contact between the foam and the machine 30.

Optionally, the machine 30 can also comprise control means 36 which will manage and control the foaming process parameters in the pumping and foaming device 100, similarly as to what was explained previously for the first embodiment. As an alternative, it is also possible that the machine 30 comprises no control means 36, meaning that the user will then adjust manually part or all of the parameters of the foaming process in the pumping and foaming device 100.

The properties of the foam obtained (quantity/size of bubbles, stability and overrun) for the fluid 1 will be determined by the foaming process carried out in the pumping and foaming device 100 of the invention, specifically by the process parameters detailed as follows.

Fluid flow rate passing from the container compartment 20 into the processing compartment 10 which depends on the rotational speed $\omega_1$ of the disc 121 and on the diameter of the fluid inlet 21 providing fluid 1 from the container compartment 20.

Amount of air coming from the air entry 13, depending on the rotational speed $\omega_1$ of the disc 121 and on the size of the air entry 13, adjustable through a regulator.

The pumping and foaming device 100 has a given width of the gap 123, which is chosen depending on the type of fluid 1 in the container compartment 20 which is to be foamed, chosen in such a way that optimal foaming effect by shear (Couette flow) is obtained. Typically, the width of the gap 123 is larger as more viscous the fluid 1 to be foamed is: for example, milk would require a much smaller gap 123 than liquid yogurt. Typically, the width of the gap 123 for milk is around 0.3 mm and the width for liquid yogurt is around 0.4 mm.

According to the invention, preferred values of the rotational speed $\omega_1$ of the disc 121 and of the pumping gear 11 are comprised between 2000 and 10000 rpm, preferably between 4000 and 8000 rpm.

Preferably, according to the invention, the pumping and foaming device 100 also comprises a code, typically a bar code, which can be arranged either on the container compartment 20 or on the processing compartment 10. The code comprises the information of at least one of the following process parameters, detailed below, which is provided to the control means 36 in the machine 30 to carry out the foaming process in an optimal way.

Rotational speed $\omega_1$ of the disc 121.

Size of the air entry 13 or optionally amount of air pumped by the air pump.

It is also possible according to the invention to add an additive compartment (not shown) adjacent to the pumping and foaming device 100, preferably in a releasable way, which provides an additive comprised in it simultaneously with the foam at the foam outlet 14. Preferably, the control means 36 in the machine 30 control by the information in the code the ratio of the additive delivery with respect to the foam delivered at the foam outlet 14.

Figure 4:
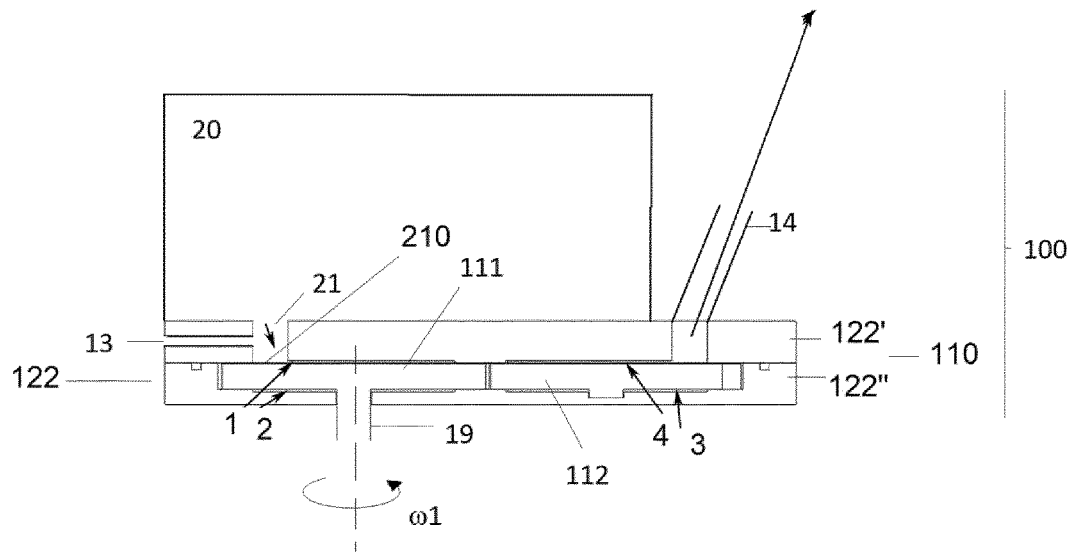
FIG. 4 shows a schematic cross-section view of the main components of the pumping and foaming device of the invention, according to a third preferred embodiment.
Figure 5:
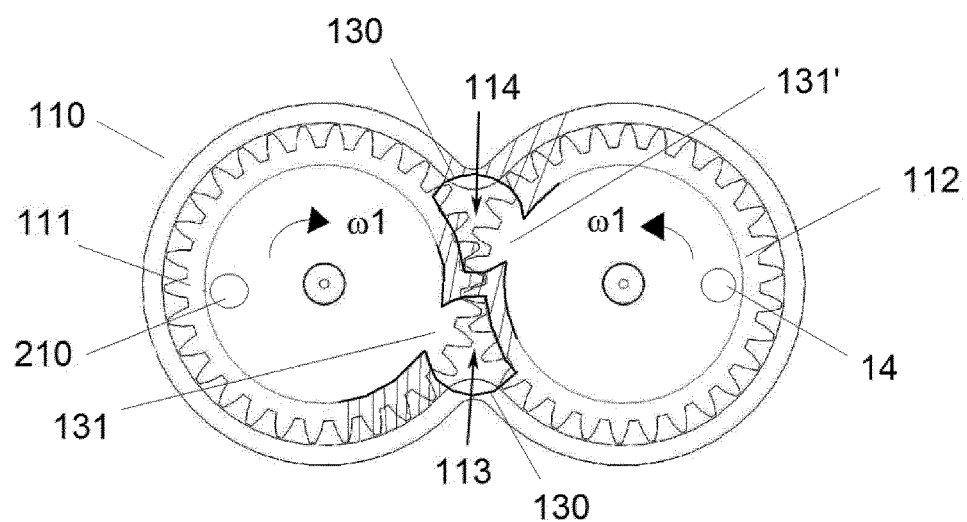
FIG. 5 shows a schematic top view of the processing compartment in the pumping and foaming device of the invention, according to a third preferred embodiment.

According to a third embodiment of the invention, as shown in FIGS. 4 and 5, the pumping and foaming device 100 comprises a processing compartment 10 and a container compartment 20: the container compartment 20 comprises the fluid 1 to be foamed and is attached to the processing compartment 10, linked through a fluid inlet 21 from where fluid 1 is drawn into the processing compartment 10. An air entry 13 is also provided at the fluid inlet 21, as shown in FIG. 4. Therefore, both fluid and air enter the processing compartment 10 through a feed inlet 210. Preferably, a regulator is provided at the air entry 13, such that the size of the air entry 13 can be adjusted by acting on this regulator.

In this embodiment, the processing compartment 10 comprises a pumping and foaming gear 110, similar to that of the first embodiment, but essentially bigger, as it carries out two operations at the same time, sucking/pumping of both air and fluid through the feed inlet 210 and foaming on the surface of the pumping and foaming gear 110, foam being provided through the foam outlet 14. The pumping and foaming gear 110 comprises a driver gear 111 which drives in rotation a driven gear 112. As shown in FIG. 4, the pumping and foaming gear 110 is arranged in the middle part of a static outer chamber 122 configured as a disc, comprising two parts, an upper disc part 122' and a lower disc part 122". As shown in more detail in FIG. 5, the upper disc part 122' comprises internally at least a protruding area 130 (in FIG. 5, two protruding areas in the upper disc part 122' have been exemplified). It is also possible that the lower disc part 122" can comprise at least one protruding area, being also possible that the lower disc part 122" comprises symmetrically arranged protruding areas 130 to those in the upper disc part 122'. At the level of the pumping and foaming gear 110, i.e., in the middle of the upper disc part 122' and the lower disc part 122", a suction area 113 and a pushing area 114 are also created, as shown in FIG. 5, and similar to the first embodiment described. The upper level defined by the upper disc part 122' comprises at least one protruding area 130 comprising a gate 131 through which there is fluid communication between the upper level (i.e., the upper disc part 122') and the middle level (i.e., the one of the pumping and foaming gear 110). When further protruding areas 130 are provided, it is possible to also provide further gates 131.

An example of foaming areas 1, 2, 3, 4 is shown in FIG. 4, though any other configuration would also be possible. In FIG. 4, foaming areas 1, 2, 3 and 4 are arranged: on the upper level, between the driver gear 111 and the upper disc part 122', between the driven gear 112 and the upper disc part 122'; on the lower level, between the driver gear 111 and the lower disc part 122", and between the driven gear 112 and the lower disc part 122". In fact, these foaming areas are located in the joint of the disc parts of the pumping and foaming gear 110 and the static outer chamber 122, where the fluid is driven by high shear stress and the foaming actually takes place by Couette flow effect. Any other possible configuration and number of the foaming areas would also be possible.

As shown in FIG. 4, the exemplified embodiment comprises a feed inlet 210 in the upper disc part 122' and a foam outlet 14 also arranged in the upper disc part 122'. However, other configurations would be possible, depending on the protruding areas 130 and, for example, there can also be two feed inlets in the upper disc part 122' and two foam outlets in the lower disc part, for example.

An exemplified configuration of the third embodiment of the invention will be now described in more detail, as it follows. The mixture of air and fluid enters the upper disc part 122' through the feed inlet 210, where it is mixed and foamed in the first foaming area 1, then passing through a first gate 131 to the suction area 113 by the rotation of the pumping and foaming gear 110. The mixture is then entrained around the driver and driven gears 111 and 112, reaching the pushing area 114, from where it is pushed out through a second gate 131' again to the upper disc part 122'. The mixture is further foamed in a fourth foaming area 4, being later delivered through the foam outlet 14.

In FIG. 4, second and third foaming areas 2 and 3 are added for increasing the foaming area and therefore the foaming of the product.

According to this third embodiment of the invention, the foaming wished to be obtained in the final product delivered through the foam outlet 14 is a function of one or a combination of the following parameters, which can be modified according to the levels targeted:
- number and positioning of the gates
- number and positioning of the feed inlet and of the foam outlet
- number and positioning of the foaming areas The pumping and foaming device 100 of the invention is connectable to driving means 31 (preferably a motor) through connecting means 19, typically comprising a shaft: the driving means 31 rotate the pumping and foaming gear 110 with respect to the upper and lower disc parts 122' and 122", at a given rotational speed $\omega_1$. In fact, the driver gear 111 rotates at $\omega_1$ and the driven gear 112 rotates at $-\omega_1$. As already explained, a suction area 113 and a pushing area 114 are created in the upper disc part 122'.

This third embodiment of the invention makes the process carried out by the pumping and foaming device 100 very efficient, as already explained and also because the elements playing a role in the processing are arranged in the same level or stage, so that both the pumping and the foaming take place in one simple operation, in the same level/plan.

Optionally, the machine 30 can comprise an air pump connectable to the processing compartment 10 and providing air through the air entry 13, typically as a function of the voltage applied to this air pump. A regulator can also be provided in the connection of the air pump with the processing compartment 10.

Also optionally, the machine 30 can also comprise a heating element 133 to heat the foam once formed, after exiting the foam outlet 14, in such a way that there is no contact between the foam and the machine 30.

Optionally, the machine 30 can also comprise control means 36 which will manage and control the foaming process parameters in the pumping and foaming device 100, similarly as to what was explained previously for the first and second embodiments. As an alternative, it is also possible that the machine 30 comprises no control means 36, meaning that the user will then adjust manually part or all of the parameters of the foaming process in the pumping and foaming device 100.

The properties of the foam obtained (quantity/size of bubbles, stability and overrun) for the fluid 1 will be determined by the foaming process carried out in the pumping and foaming device 100 of the invention, specifically by the process parameters detailed as follows.
- Fluid flow rate passing from the container compartment 20 into the processing compartment 10 which depends on the rotational speed $\omega_1$ of the pumping gear 11, on the diameter of the fluid inlet 21 providing fluid 1 from the container compartment 20 and on the size of the teeth of the pumping and foaming gear 11.
- Amount of air coming from the air entry 13, depending on the rotational speed $\omega_1$ of the pumping gear 11 and on the size of the air entry 13, adjustable through a regulator.

The pumping and foaming device 100 has a given width in the foaming areas 1, 2, 3 and 4, chosen depending on the type of fluid 1 in the container compartment 20 which is to be foamed, such that optimal foaming effect by shear (Couette flow) is obtained. Typically, the width of the foaming areas 1, 2, 3 and 4 is essentially the same, being larger as more viscous the fluid 1 to be foamed is: typical values would be of around 0.3 mm for milk and around 0.4 mm for liquid yogurt.

According to the invention, preferred values of the rotational speed $\omega_1$ of the pumping gear 11 are comprised between 2000 and 10000 rpm, preferably between 4000 and 8000 rpm.

The driver gear 111 and the driven gear 112 in the pumping gear 11 can be of the same diameter or of different diameters, then having different rotational speeds.

Preferably, according to the invention, the pumping and foaming device 100 also comprises a code, typically a bar code, which can be arranged either on the container compartment 20 or on the processing compartment 10. The code comprises the information of at least one of the following process parameters, detailed below, which is provided to the control means 36 in the machine 30 to carry out the foaming process in an optimal way.
- Rotational speed $\omega_1$ of the pumping gear 11.
- Size of the air entry 13 or optionally amount of air pumped by the air pump.

It is also possible according to the invention to add an additive compartment (not shown) adjacent to the pumping and foaming device 100, preferably in a releasable way, which provides an additive comprised in it simultaneously with the foam at the foam outlet 14. Preferably, the control means 36 in the machine 30 control by the information in the code the ratio of the additive delivery with respect to the foam delivered at the foam outlet 14.

Typically, a complete pumping and foaming system is configured, this system comprising a pumping and foaming device 100 and a machine 30. Typically, the pumping and foaming device 100 would comprise a processing compartment 10 and a container compartment 20; optionally a code can also be provided either in the processing compartment 10 or in the container compartment 20.

Although the present invention has been described with reference to preferred embodiments thereof, many modifications and alterations may be made by a person having ordinary skill in the art without departing from the scope of this invention which is defined by the appended claims.

LIST OF REFERENCES

100 Pumping and foaming device
  10 Processing compartment
    11 Pumping gear
      111 Driver gear
      112 Driven gear
      113 Suction area
      114 Pushing area
    110 Pumping and foaming gear
      122' Upper disc part
      122" Lower disc part
      130 Protruding areas
      131 Gate
      131' Gate
    210 Feed inlet
    1 First foaming area
    2 Second foaming area
    3 Third foaming area
    4 Fourth foaming area
    12 Foaming element 121 Disc
ω₁ Rotational speed of disc
122 Outer chamber
123 Gap
15 Rotation axis
13 Air entry
131 Primary air channel
132 Secondary air channel
14 Foam outlet
19 Connecting means
20 Container compartment
21 Fluid inlet
30 Machine
31 Driving means
36 Control means

The invention claimed is:

1. A pumping and foaming system comprising:
a pumping and foaming device comprising a container compartment where a foamable fluid is stored, an air entry through which air is provided into the pumping and foaming device, and a processing compartment where the foamable fluid is pumped and foamed with the air, the processing compartment comprising at least one movable part and a static part movable with respect to each other, and the at least one movable part and the static part arranged in such a way that their relative movement pumps the foamable fluid by suction from the container compartment into the processing compartment and also drives a mixture of air and fluid through a gap providing a certain level of shear stress which allows the mixture to form a foam; and a machine, the pumping and foaming device being connectable to the machine and the machine comprising a driver for driving the at least one movable part,
the at least one movable part comprises a pumping gear and a disc, and the static part comprises an outside chamber, the disc being rotatable with respect to the outside chamber, the pumping gear comprising a rotatable driver gear and a rotatable driven gear whose relative rotation creates a suction area, where the air and the foamable fluid are pumped by suction and are pre-mixed to form the mixture, and a pushing area, where the mixture of the air and the foamable fluid is driven in the gap between the disc and the outside chamber under the certain level of shear stress which allows the mixture to be foamed.

2. The pumping and foaming device according to claim 1, wherein the gap is formed between the at least one moveable part and the static part of the processing compartment, the at least one moveable part is arranged to rotate relative to the static part, and the at least one moveable part and the static part are arranged in a configuration selected from the group consisting of substantially parallel to each other and substantially concentrically to each other.

3. The pumping and foaming device according to claim 1, wherein the container compartment and the processing compartment are connected by single-use connection to make the pumping and foaming device disposable.

4. The pumping and foaming device according to claim 1, wherein the processing compartment is configured as a lid, and the container compartment is configured as a bottle or pouch.

5. The pumping and foaming device according to claim 1, comprising an additive compartment releasably attached to the pumping and foaming device providing an additive simultaneously with the foam.

6. The pumping and foaming system according to claim 1, wherein the machine comprises a heating element which heats the foam once formed, after the foam exits the pumping and foaming device.

7. The pumping and foaming system according to claim 1, wherein the machine comprises a controller which adjusts a size of the air entry and a speed of the at least movable part with respect to the static part.

8. The pumping and foaming system according to claim 1, wherein the gap is formed between the at least one moveable part and the static part of the processing compartment, the at least one moveable part is arranged to rotate relative to the static part, the at least one moveable part and the static part are arranged in a configuration selected from the group consisting of substantially parallel to each other and substantially concentrically to each other, and the at least one moveable part and the static part are arranged so that their relative movement pumps the air by suction and mixes the air with the foamable fluid in the processing compartment.

9. A pumping and foaming device comprising: a container compartment where a foamable fluid is stored, an air entry through which air is provided into the pumping and foaming device, and a processing compartment where the foamable fluid is pumped and foamed with the air, the processing compartment comprising at least one movable part and a static part movable with respect to each other, and the at least one movable part and the static part arranged such that their relative movement pumps the foamable fluid by suction from the container compartment into the processing compartment and also drives a mixture of the air and the foamable fluid through a gap providing a certain level of shear stress which allows the mixture to form a foam,
the gap is formed between the at least one moveable part and the static part of the processing compartment, the at least one moveable part is arranged to rotate relative to the static part, the at least one moveable part and the static part are arranged substantially parallel and/or concentrically to each other, and the gap has a width in a range of from 0.2 mm to 0.6 mm.

10. A pumping and foaming device comprising: a container compartment where a foamable fluid is stored, an air entry through which air is provided into the pumping and foaming device, and a processing compartment where the foamable fluid is pumped and foamed with the air, the processing compartment comprising at least one movable part and a static part movable with respect to each other, and the at least one movable part and the static part arranged such that their relative movement pumps the foamable fluid by suction from the container compartment into the processing compartment and also drives a mixture of the air and the foamable fluid through a gap providing a certain level of shear stress which allows the mixture to form a foam,
the gap is formed between the at least one moveable part and the static part of the processing compartment, the at least one moveable part is arranged to rotate relative to the static part, the at least one moveable part and the static part are arranged substantially parallel and/or concentrically to each other, and the at least one moveable part and the static part are arranged so that their relative movement pumps the air by suction and mixes the air with the foamable fluid in the processing compartment.

11. The pumping and foaming device according to claim 10, wherein an amount of the air entering the pumping and foaming device is adjustable by modifying a size of the air entry and/or by adjusting a speed of the at least one movable part with respect to the static part.

12. The pumping and foaming device according to claim 11, comprising a readable code carrying data indicative of the size of the air entry and/or the speed of the at least one moveable part with respect to the static part.

13. A pumping and foaming device comprising: a container compartment where a foamable fluid is stored, an air entry through which air is provided into the pumping and foaming device, and a processing compartment where the foamable fluid is pumped and foamed with the air, the processing compartment comprising at least one movable part and a static part movable with respect to each other, and the at least one movable part and the static part arranged such that their relative movement pumps the foamable fluid by suction from the container compartment into the processing compartment and also drives a mixture of the air and the foamable fluid through a gap providing a certain level of shear stress which allows the mixture to form a foam, the at least one movable part comprises a pumping gear and a disc, and the static part comprises an outside chamber, the disc being rotatable with respect to the outside chamber, the pumping gear comprising a rotatable driver gear and a rotatable driven gear whose relative rotation creates a suction area, where the air and the foamable fluid are pumped by suction and are pre-mixed to form the mixture, and a pushing area, where the mixture of the air and the foamable fluid is driven in the gap between the disc and the outside chamber under the certain level of shear stress which allows the mixture to be foamed.

14. A pumping and foaming device comprising: a container compartment where a foamable fluid is stored, an air entry through which air is provided into the pumping and foaming device, and a processing compartment where the foamable fluid is pumped and foamed with the air, the processing compartment comprising at least one movable part and a static part movable with respect to each other, and the at least one movable part and the static part arranged such that their relative movement pumps the foamable fluid by suction from the container compartment into the processing compartment and also drives a mixture of the air and the foamable fluid through a gap providing a certain level of shear stress which allows the mixture to form a foam, the at least one movable part comprises a disc, and the static part comprises an outside chamber, the disc being rotatable with respect to the outside chamber, and the container compartment being configured as a capsule, such that a relative rotation of the disc with respect to the outside chamber pumps the air and the foamable fluid by suction using centrifugal forces and also foams the pumped air and foamable fluid by the shear stress.

15. The pumping and foaming device according to claim 14, wherein the air entry is arranged in an upper side of the container compartment, the air entry being linked to a primary air channel which allows the air to enter the container compartment to replace the foamable fluid which has been foamed, the air entry being also linked to a secondary air channel which provides the air to be mixed with the foamable fluid to produce the foam.

16. A pumping and foaming device comprising: a container compartment where a foamable fluid is stored, an air entry through which air is provided into the pumping and foaming device, and a processing compartment where the foamable fluid is pumped and foamed with the air, the processing compartment comprising at least one movable part and a static part movable with respect to each other, and the at least one movable part and the static part arranged such that their relative movement pumps the foamable fluid by suction from the container compartment into the processing compartment and also drives a mixture of the air and the foamable fluid through a gap providing a certain level of shear stress which allows the mixture to form a foam, the at least one movable part comprises a disc and a pumping and foaming gear, and the static part comprises an outside chamber, the disc being rotatable with respect to the outside chamber comprising an upper disc part and a lower disc part such that the pumping and foaming gear is arranged between the upper disc part and the lower disc part, the pumping and foaming gear comprising a rotatable driver gear and a rotatable driven gear whose relative rotation creates a suction area, where the air and the foamable fluid are pumped by suction and are pre-foamed to form a foamed mixture, and a pushing area, where the foamed mixture of the air and the foamable fluid is driven outside the pumping and foaming device.

17. The pumping and foaming device according to claim 16, wherein the upper disc part comprises at least one internal protruding area configuring an internal upper flow path providing at least one foaming area where the foamable fluid and the air are driven by the shear stress in order to be foamed.

18. The pumping and foaming device according to claim 17, wherein the pumping and foaming process carried out in the pumping and foaming device is adapted by acting on one or a combination of the following: positioning of a fluid inlet and a foam outlet; positioning of foaming areas; positioning of gates communicating protruding areas with the pumping and foaming gear.

\* \* \* \* \*